(12) United States Patent
Andrade et al.

(10) Patent No.: US 8,407,360 B2
(45) Date of Patent: Mar. 26, 2013

(54) GENERATING A DISTRIBUTED STREAM PROCESSING APPLICATION

(75) Inventors: Henrique Andrade, Croton-on-Hudson, NY (US); Bugra Gedik, White Plains, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/495,534

(22) Filed: Jun. 13, 2012

(65) Prior Publication Data
US 2012/0259910 A1    Oct. 11, 2012

Related U.S. Application Data

(63) Continuation of application No. 12/130,043, filed on May 30, 2008, now Pat. No. 8,291,006.

(51) Int. Cl.
G06F 15/16    (2006.01)

(52) U.S. Cl. .................................. 709/231; 718/100

(58) Field of Classification Search .................. 709/201, 709/231; 718/100; 717/100, 114, 117
See application file for complete search history.

(56) References Cited

U.S. PATENT DOCUMENTS
2008/0250390 A1* 10/2008 Feblowitz et al. ............ 717/114

OTHER PUBLICATIONS

Abadi et al., The Design on the Borealis Stream Processing Engine, Proceedings of the 2005 CIDR Conference.
Amini et al., The Stream Processing Core, Proceedings of the Workshop on Data Mining Standards, Services and Platforms, DM-SSP, 2006.
Andrade et al., Scale-up Strategies for Processing High-Rate Data Streams in System S, International Conference on Supercomputing, ACM ICS, 2008.
Arasu et al., Stream: The Stanford Stream Data Manager, IEEE Data Engineering Bulletin, 26, 2003.
Arasu et al., The CQL Continuous Query Language: Semantic Foundations and Query Execution, Technical report, InfoLab—Stanford University, Oct. 2003.
Balakrishnan et al., Retrospective on Aurora, VLDB Journal, Special Issue on Data Stream Processing, 2004.
Chandrasekaran et al., TelegraphCQ: Continuous Dataflow Processing for an Uncertain World, Proceedings of the Conference on Innovative Data Systems Research, CIDR, 2003.
Coral8, Inc., http://www.coral8.com, May 2007.
IBM DB2. http://www.ibm.com/db2, Oct. 2007.
Gedik et at., CellSort: High Performance Sorting on the Cell Processor, Proceedings of the Very Large Data Bases Conference, VLDB, 2007.
Gedik, et al., Executing Stream Joins on the Cell Processor, Proceedings of the Very Large Data Bases Conference, VLDB, 2007.
Girod, et al., XStream: a Signal-Oriented Data Stream Management System, Proceedings of the International Conference on Data Engineering, IEEE ICDE, 2008.
IBM General Parallel File System, http://www.ibm.com/system/clusters/software/gpfs, Oct. 2007.
Hulten et al., VFML—a toolkit for mining high-speed time-changing data streams, http://www.cs.washington.edu/dm/vfml/, 2003.

(Continued)

Primary Examiner — Frantz Jean
(74) Attorney, Agent, or Firm — Ryan, Mason & Lewis, LLP

(57) ABSTRACT

Techniques for generating a distributed stream processing application are provided. The techniques include obtaining a declarative description of one or more data stream processing tasks from a graph of operators, wherein the declarative description expresses at least one stream processing task, generating one or more containers that encompass a combination of one or more stream processing operators, and generating one or more execution units from the declarative description of one or more data stream processing tasks, wherein the one or more execution units are deployable across one or more distributed computing nodes, and comprise a distributed data stream processing application binary.

24 Claims, 6 Drawing Sheets

OTHER PUBLICATIONS

IBM, Cell1 Broadband Engine Architecture and its First Implementation, Technical Report Version 1.0, IBM Systems and Technology Group, 2005.

Intel. IXP2400 Network Processor Hardware Reference Manual. Technical report, Intel Corporation, May 2003.

Jain et al., Design, Implementation, and Evaluation of the Linear Road Benchmark on the Stream Processing Core, Proceedings of the International Conference on Management of Data, ACM SIGMOD, 2006.

Liu et al., Use of OWL for describing Stream Processing Components to Enable Automatic Composition, In OWL: Experiences and Directions, OWLED, 2007.

Mathworks MATLAB, http://www.mathworks.com/, Oct. 2007.

Stream Base Systems, http://streambase.com, May 2007.

IBM, Unstructured Information Management Architecture (UIMA), http://www.research.ibm.com/UIMA, Aug. 2007.

IBM WebSphere Front Office for Financial Markets, http://www.ibm.com/software/integration/wfo, Oct. 2007.

Wu et al., Challenges and Experience in Prototyping a Multi-Modal Stream Analytic and Monitoring Application on System S, Proceedings of the Very Large Data Bases Conference, VLDB, 2007.

Gedik et al., Spade: The System's Declarative Stream Processing Engine, ACM SIGMOD NY 2008, pp. 1123-1134.

Cherniack et al., Scalable Distributed Straming Processing, 2003 CIDR Conference, from Harvard.edu.

* cited by examiner

US 8,407,360 B2

GENERATING A DISTRIBUTED STREAM PROCESSING APPLICATION

CROSS-REFERENCE TO RELATED APPLICATIONS

This application is a continuation of U.S. patent application Ser. No. 12/130,043, filed on May 30, 2008, and incorporated by reference herein.

STATEMENT OF GOVERNMENT RIGHTS

This invention was made with Government support under Contract No.: H98230-07-C-0383/Distillery Phase IV, awarded by Intelligence Agencies. The Government has certain rights in this invention.

FIELD OF THE INVENTION

The present invention generally relates to information technology, and, more particularly, to data stream processing.

BACKGROUND OF THE INVENTION

On-line information sources are increasingly taking the form of data streams, that is, time ordered series of events or readings. Example data streams can include, for example, live stock and option trading feeds in financial services, physical link statistics in networking and telecommunications, sensor readings in environmental monitoring and emergency response, and satellite and live experimental data in scientific computing. The proliferation of these sources has created a paradigm shift in how data is processed, moving away from the traditional "store and then process" model of database management systems toward the "on-the-fly processing" model of emerging data stream processing systems (DSPSs).

Flexible application composition is a major challenge in the development of large-scale distributed data stream processing applications. In a distributed environment, finding an application partitioning scheme that leads to superior performance is challenging. The basic building blocks of a stream processing application should advantageously be of small granularity representing simple operations. In general, this would enable flexible decomposition of the processing and better mapping of the application to the characteristics of the underlying hardware. However, in existing approaches, such fine granular stream operators may incur a large performance overhead in a distributed system due to inter-process communication.

SUMMARY OF THE INVENTION

Principles of the present invention provide techniques for generating a distributed stream processing application.

An exemplary method (which may be computer-implemented) for generating a distributed stream processing application, according to one aspect of the invention, can include steps of obtaining a declarative description of one or more data stream processing tasks from a graph of operators, wherein the declarative description expresses at least one stream processing task, generating one or more containers that encompass a combination of one or more stream processing operators, and generating one or more execution units from the declarative description of one or more data stream processing tasks, wherein the one or more execution units are deployable across one or more distributed computing nodes, and comprise a distributed data stream processing application binary.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
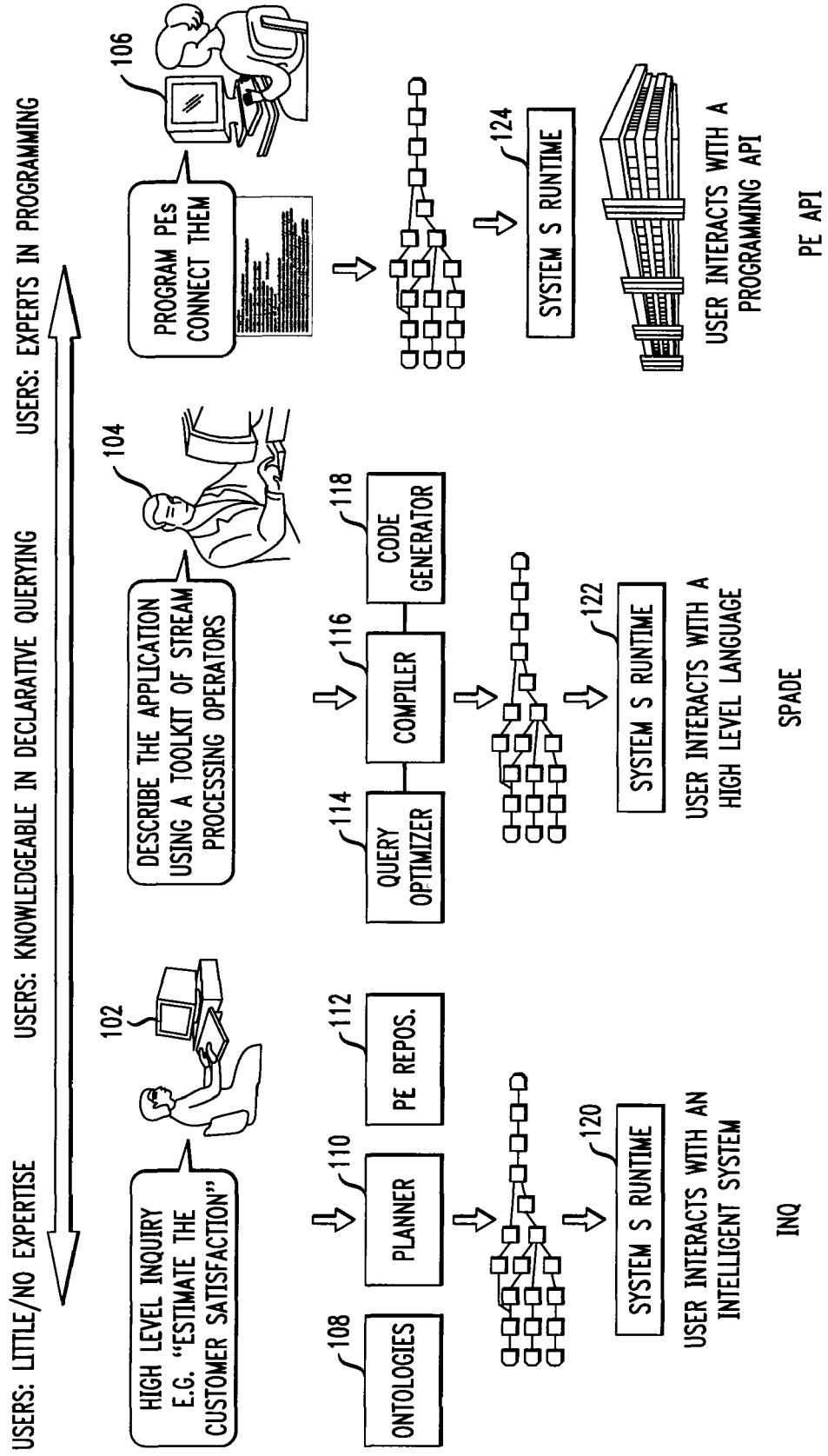
FIG. 1 is a diagram illustrating System S from an application developer perspective, according to an embodiment of the present invention.

Principles of the present invention include techniques for generating distributed stream processing applications from declarative descriptions. One or more embodiments of the invention can include, for example, a declarative language to express stream processing tasks using fine granularity operators, as well as a compiler that can flexibly generate execution units that are deployable across distributed computing nodes. Additionally, one or more embodiments of the present invention include a declarative stream processing engine that includes, for example, a combination of a stream-centric, operator-based language, with a code generation framework to create highly-optimized distributed stream processing applications.

The techniques described herein include a code generation framework to create highly-optimized distributed stream processing applications from declarative descriptions of data stream processing tasks. One or more embodiments of the invention enable application developers to construct applications with fine granularity stream operators without worrying about the performance implications that might exist in a distributed system. Furthermore, the techniques described herein avoid the inflexibility in application deployment that are been caused if coarse grained operators are used. An exemplary code generation framework, as described herein, enables mapping applications into appropriately sized execution units in order to minimize communication overhead.

One or more embodiments of the present invention include a declarative stream processing engine, also referred to herein as System S' Spade. System S can include a large-scale, distributed data stream processing middleware. As a front-end for rapid application development for System S, one or more embodiments of the invention provide Spade, an intermediate language for flexible composition of parallel and distributed data-flow graphs, a toolkit of type-generic, built-in stream processing operators, that support scalar as well as vectorized processing and can seamlessly inter-operate with user-defined operators, and a rich set of stream adapters to ingest and/or publish data from and/or to outside sources.

Also, the techniques described herein can automatically bring performance optimization and scalability to System S applications. To that end, one or more embodiments of the invention can employ a code generation framework to create highly-optimized applications that run natively on the stream processing core (SPC), the execution and communication substrate of System S, and take full advantage of other System S services. Spade allows developers to construct their applications with fine granular stream operators without worrying about the performance implications that might exist, even in a distributed system.

One or more embodiments of the invention include an optimizing compiler that automatically maps applications into appropriately sized execution units in order to minimize communication overhead, while at the same time exploiting available parallelism. By virtue of the scalability of the System S run-time and Spade's effective code generation and optimization, one can scale applications to a large number of nodes. For example, one can run Spade jobs on ≈500 processors within more than 100 physical nodes in a tightly connected cluster environment.

As described herein, one or more embodiments of the present invention include an intermediate language for flexible composition of parallel and distributed data-flow graphs. This language sits in-between higher level programming tools and languages such as, for example, the System S integrated development environment (IDE) or stream SQL1 and the lower level System S programming application programming interfaces (APIs). Spade language can provide constructs such as, for example, loops, stream bundles, node pools, and operator partitions to ease the specification and configuration of flow graphs in various distributed environments.

The techniques described herein can also include a toolkit of type-generic built-in stream processing operators. Spade supports all basic stream-relational operators with rich windowing and punctuation semantics, and also seamlessly integrates built-in operators with user-defined ones. One particularly powerful feature of built-in Spade operators is the ability to operate on list types and the ability to intermix scalar and vectorized processing on lists.

Additionally, one or more embodiments of the invention can include a broad range of stream adapters. Such adapters can be used to ingest data from outside sources and publish data to outside destinations such as, for example, network sockets, relational and XML databases, file systems, etc.

The techniques described herein leverage the existing stream processing infrastructure offered by the SPC component of System S. Given an application specification in Spade's intermediate language, a Spade compiler can generate optimized code that runs on SPC as a native system S application. As a result of this code generation framework, Spade applications enjoy a variety of services provided by the system S run-time such as, for example, placement and scheduling, distributed job management, failure-recovery, and security.

Also, such a multi-layered framework creates opportunities for the compiler to perform various optimizations, so as to best map the higher level constructs into the lower-level ones that the System S run-time expects in order to efficiently run a distributed stream processing application. For instance, one or more embodiments of the invention enable developers to structure their applications using fine granular stream operators without worrying about the performance implications that might exist in a distributed system. Spade's optimizing compiler automatically maps applications into appropriately sized execution units in order to minimize the communication overhead, while at the same time exploiting available parallelism.

In contrast to disadvantageous existing approaches, the techniques described here inherit its scalability from the System S SPC, and provide both language constructs and compiler optimizations to fully utilize and expose the performance and flexibility of SPC. The distributed flow-graph composition constructs offer an easy way to harness the power of System S, whereas the compiler optimizations deliver high-performance stream processing operators, which can be ideally partitioned into properly sized execution units to best match the run-time resources of System S.

One or more embodiments of the invention can also include applications that are expected to be long-running continuous queries. These applications can be developed and deployed incrementally. In other words, a deployable application component (a Spade job and/or query) can tap into existing streams that are generated by already deployed Spade or non-Spade System S jobs. Such connections can optionally be determined dynamically at run-time using SPC's ability to discover source streams based on type compatibility. The techniques described herein also support all fundamental stream-relational operators, with extensions to process list types. Supporting list types and vectorized operations on them enables Spade to handle, without performance penalty, mixed-workloads such as those in signal processing applications that usually treat a list of samples as the basic unit of data processing.

One or more embodiments of the invention provide a stream-centric and operator-based language for declaring stream processing applications that can include, for example, type-generic declarative data stream processing operators, user-defined operators to wrap legacy code, and procedural constructs to control the composition and coalescing level of operators.

The techniques described herein can generate native System S applications that can, for example, integrate with the rest of the system components and are interoperable with non-SPADE applications. Also, one or more embodiments of the present invention include systems support for composing high-performance distributed applications. Flexible application composition is a major challenge in existing approaches in the development of large-scale distributed data stream processing applications. For example, finding an application partitioning scheme that leads to superior performance is challenging.

As described herein, basic blocks of a stream processing application should be of small granularity, representing simple operations. Such a composition enables flexible decomposition of the processing and better mapping of the application to the characteristics of the underlying hardware and network, but incurs a large performance overhead in a distributed system, due to inter-process communication.

As such, one or more embodiments of the present invention include a code generation-based solution that includes a code generation framework to create highly-optimized distributed stream processing applications from declarative descriptions of data stream processing tasks. The techniques described herein enable application developers to construct their applications with fine granularity stream operators without worrying about the performance implications that might exist in a distributed system. One or more embodiments of the invention also provide the ability to map applications into appropriately sized execution units in order to minimize communication overhead. Additionally, one or more embodiments of the invention can include underlying mechanisms such as, for example, operator graph partitioning and operator fusion.

Also, based on a code generation framework, one or more embodiments of the invention can include native System S high-performance C++ code as well as hardware architecture-specific optimizations. The techniques described herein also include a compiler optimization approach that can include inputs of, for example, applications, run-time environments, and workloads, as well as outputs that can include, for example, native code that implements the best partitioning (wherein an underlying mechanism may include, for example, operator fusion).

As described here, System S supports structured as well as unstructured data stream processing and can be scaled from one to thousands of compute nodes. System S run-time can execute a large number of long-running jobs (queries) that take the form of data-flow graphs. A data-flow graph can include a set of processing elements (PEs) connected by streams, wherein each stream carries a series of stream data objects (SDOs). The PEs implement data stream analytics and are basic execution units that are distributed over the compute nodes. The PEs also communicate with each other via input and output ports, connected by streams. The PE ports, as well as streams connecting them, can be typed.

Additionally, System S can, for example, adopt the unstructured information management architecture (UIMA) framework for the type system. PEs can be explicitly connected using hard-coded links (for example, input port 0 of PE A is connected to output port 1 of PE B) or through implicit links that rely on type compatibility (for example, input port 0 of PE A is connected to any output port that provides a superset of what it expects). The latter type of connections is dynamic and allows System S to support incremental application development and deployment. Besides these fundamental functionalities, System S can provide several other services such as, for example, reliability, scheduling and placement optimization, distributed job management, storage services, and security, etc.

System S provides several alternatives for a user or developer to craft data-flow graphs, as depicted in FIG. 1. FIG. 1 is a diagram illustrating System S from an application developer perspective, according to an embodiment of the present invention. By way of illustration, FIG. 1 depicts the elements of user 102, user 104, user 106, ontologies 108, planner 110, PE repository 112, query optimizer 114, compiler 116, code generator 118, system S120, system S122 and system S124. At one extreme, an experienced developer can use a programming language such as C++ or Java to implement the desired stream analytics as PEs, utilizing system S' PE APIs. In such a case, the developer also creates PE templates that describe each PE in terms of its input and output ports, and populates a configuration file that describes the topology of the data-flow graph. These activities could be simplified via the use of the System S IDE.

At the other extreme, a user with little or no expertise could pose natural language-like, domain-specific inquiries to the system. The inquiry services (INQ) planner can use an existing set of PEs developed for the particular domain at hand, together with their semantic descriptions and a domain ontology, to automatically create a data-flow graph that implements the user's high-level inquiry.

In contrast, one or more embodiments of the invention can, for example, strike a middle-ground between the aforementioned two alternatives, by providing a declarative processing front-end to the users, while still making it possible to integrate arbitrary user-defined or legacy code into the data-flow graph. Developers interacting with Spade can use a set of well-defined, type-generic, and highly configurable operators and stream adapters to compose their applications. Spade's intermediate language can also provide several constructs to ease the development of distributed data-flow graphs, and exposes various knobs to influence their deployment. Furthermore, it forms a common ground on top of which support for other interfaces can be built. For instance, the INQ planner can potentially generate Spade applications from high-level inquiries, or a StreamSQL query specification can be converted into a Spade application.

Figure 2:
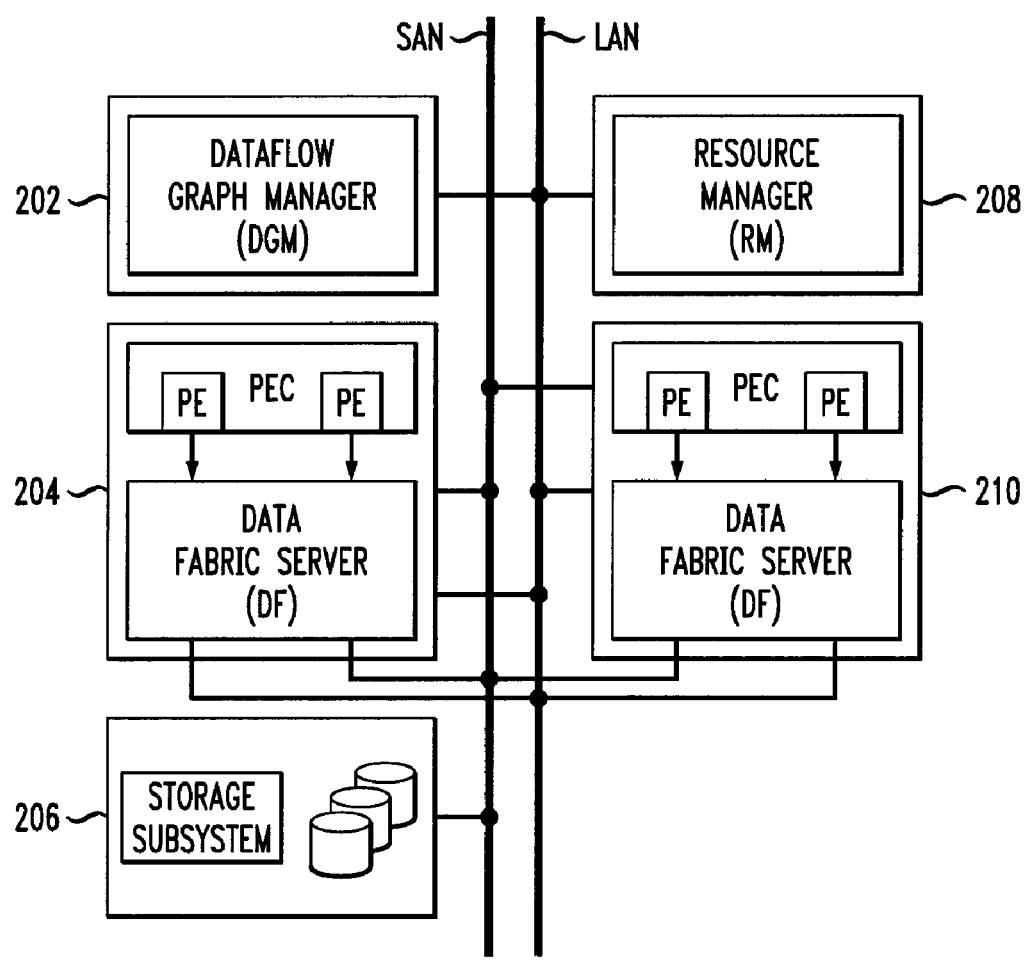
FIG. 2 is a diagram illustrating a stream processing core, according to an embodiment of the present invention.

Because SPC provides the execution and communication substrate for Spade, the basics of how a data-flow graph is executed by the run-time is important in understanding Spade's code generation and optimization framework. FIG. 2 depicts the key architectural components of SPC run-time.

FIG. 2 is a diagram illustrating a stream processing core, according to an embodiment of the present invention. By way of illustration, FIG. 2 depicts the elements of a dataflow graph manager (DGM) 202, a component 204 that includes a PE container (PEC), PEs and a data fabric (DF) server, a component 206 that includes a storage subsystem for persisting streams, a resource manager (RM) 208 and a component 210 that includes PEC, PEs and a DF server.

The dataflow graph manager (DGM) determines stream connections among PEs, and matches stream descriptions of output ports with the flow specifications of input ports. The data fabric (DF) is the distributed data transport component that includes a set of daemons, one on each node supporting the system. Upon guidance from the DGM, the DF establishes the transport connections between PEs and moves SDOs from producer PEs to consumer PEs. The resource manager (RM) collects run-time statistics from the DF daemons and the PE execution containers (PECs). This information is used by the System S optimizer, a component called SODA, for making global placement and scheduling decisions. The PE execution container (PEC) provides a run-time context and access to the System S middleware and acts as a security barrier, preventing the user-written applications from corrupting the System S middleware as well as each other.

Figure 3:
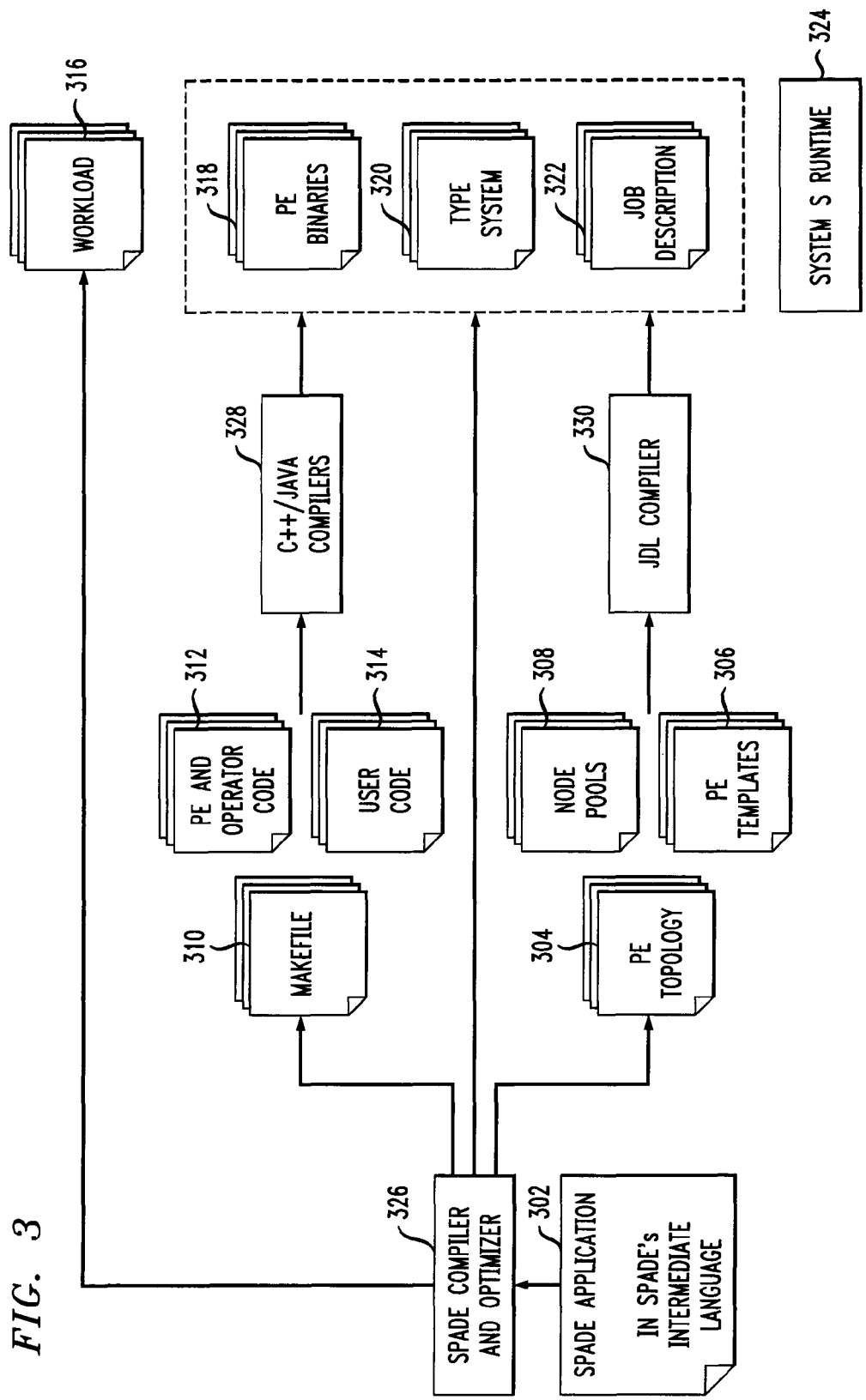
FIG. 3 is a diagram illustrating Spade's code generation framework, according to an embodiment of the present invention.

Developers interact with one or more embodiments of the invention through the intermediate language and the compiler. The compiler takes a query (job) specification in Spade's intermediate language as input and generates all the artifacts commonly associated with a native System S application. FIG. 3 illustrates the details of this process. FIG. 3 is a diagram illustrating Spade's code generation framework, according to an embodiment of the present invention. By way of illustration, FIG. 3 depicts the elements of a Spade application 302, PE topology 304, PE templates 306, node pools 308, makefile 310, PE and operator code 312 and user code 314. FIG. 3 also depicts the elements of workload 316, PE binaries 318, type system 320, job description 322, system S run-time 324, Spade compiler and optimizer 326, C++/Java compilers 328 and job description language (JDL) compiler 330.

The Spade compiler first generates code that implements the stream operator instances specified in the Spade query, and then generates additional code to pack these operators into PEs that form the basic execution units distributable over a System S cluster. This mapping can be optimized manually (by the user through language constructs) or automatically (by the compiler through learning).

The compiler can also generate PE templates, a type system specification, a PE topology that describes the connections among PEs and PE-to-node assignments, and node pools that list the compute nodes to be used during execution. These are fed into the System S job description language (JDL) compiler to yield a complete job description. The operator and PE code are compiled into executable binaries, using traditional programming language compilers and linking against the Spade and other System S libraries. The JDL file and the set of PE binaries form a readily deployable job on a System S cluster running the SPC.

In order to support customizable data stream processing operators, one or more embodiments of the present invention rely on a code generation framework, instead of having type-generic operator implementations that employ some form of condition interpretation and type introspection. The reliance on code generation provides the ability to create highly optimized platform- and application-specific code. In contrast to traditional database query compilers, the compiler described herein outputs code that is tailored to the application at hand as well as system-specific aspects such as the underlying network topology, the distributed processing topology for the application (that is, where each piece will run), and the computational environment, including hardware and architecture-specific tuning. If an application created with Spade is a long-running query, then the long run-times amortize the build costs. Nevertheless, the Spade compiler has numerous features to support incremental builds as the application gets modified, greatly reducing the build costs as well.

The Spade programming model includes a programming language and the ancillary support run-time libraries and tooling (for example, parser, code generators, and optimizer). The programming model provides high-level constructs where application and tool writers alike can quickly assemble their applications, as well as creates a framework that enables the compiler to have direct access to the important optimization knobs such that applications are able to derive the best performance from the underlying run-time system. Additionally, with a programming model such as described herein, out-of-the-box constructs can be extended by adding new language operators and by extending the existing language operators with new capabilities. Specifically, the programming model and the tooling are designed to support the addition of external edge adapters as well as new operators, enabling developers to incrementally add additional operators, forming new, and potentially shareable, toolkits.

For example, two design decisions can enable the achievement of the goals stated above: a stream-centric design, and an operator-level programming model. The stream-centric design implies building a programming language where the basic building block is a stream. In other words, an application writer can quickly translate the flows of data she anticipates from a back-of-the-envelope prototype into the application skeleton by simply listing the data flows. The second aspect, that is, operator-level programming, is focused on designing the application by reasoning about the smallest possible building blocks that are necessary to deliver the computation an application is supposed to perform. Here it can be noted that, while it is hard to precisely define what an operator is, in most application domains, application engineers typically have a good understanding about the collection of operators they intend to use. For example, database engineers typically conceive their applications in terms of the operators available in the stream relational algebra. Likewise, MATLAB programmers have several toolkits at their disposal, from numerical optimization to symbolic manipulation to signal processing that, depending on the application domain, are appropriately used.

The importance of an operator-centric view of applications is two fold. On one hand, it gently nudges application writers to think in terms of fine-granularity operations, that is, the fundamental processing pieces that need to be put together. On the other hand, it exposes multiple optimization opportunities (namely, the inner-workings of the operator as well as the operator boundaries) that are important for generating distributed (and parallel) code that will, ultimately, run efficiently on the computing resources. Note that a side benefit of this approach is that, through a recompilation, one can typically obtain different versions of the same application which are specifically optimized for different computational platforms. For example, the run-time application layout, as well as the internal operator implementation for a cluster of x86 nodes, may not necessarily be the same as the one for a large symmetric multiprocessor box. The Spade code generators described herein were designed with such specialization in mind.

From a programming standpoint, Spade's syntax and structure can be centered on exposing the controls to the main tasks associated with designing applications. At the same time, it effectively hides the complexities associated with basic data streaming manipulations (for example, generic language support for data types and building block operations), application decomposition in a distributed computing environment (for example, how should the application be laid out in the computing environment), and the underlying computing infrastructure and data transport issues (for example, where to deploy each operator, how to best ingest external data and externalize the data being produced, etc).

The source code for an application written in the Spade language can be organized, for example, in terms of sections such as application meta-information, type definitions, external libraries, node pools and program body. Application meta-information lists the application name, followed optionally by the debug and/or tracing level desired. Type definitions can be where application designers must create a namespace for the types to be used by the application as well as, optionally, aliases to the types they intend to use. The type namespace provides type system-level isolation amongst System S applications that may be concurrently running on the system. External libraries include an optional section where application designers can include references to libraries and their file system paths, as well as the header files with interfaces for the external libraries employed by user-defined operators.

Node pools include an optional section where pools of compute nodes can be defined. While an application written in Spade can be fully optimized by the compiler (at compile-time) and by the System S resource management infrastructure and scheduler (at run-time), the creation of node pools provides a great deal of fine-level control over placement and partitioning during development and hand-optimization phases. Program body can be where the application itself is described. Spade's application description can be stream-centric in the sense that streams are first class objects. The flow of computation is completely described by the streams an application produces.

A typical application will ingest an external (non-System S) data stream, creating a Spade stream, process that stream through the utilization of one or more language-supported operators or user-defined operators, and externalize a data stream by producing a resulting flow that can be tapped by software components that are external to the system S infrastructure. Streams can be created either by manipulating and converting data coming from an external source into a data flow understood by System S (using Spade's source operator) or by performing a data transformation on an incoming stream, carried out by another Spade language operator or user-defined operator (udop, for short). Once a Spade stream is available, it can be externalized by creating sinks, whereby the flow of data is sent to entities that are outside of System S. The sink operator used to perform this externalization can write to files, sockets, among other edge adapters. The techniques described herein support having feedback loops within data flow graphs, where a stream generated by a downstream operator is connected back into the input of an upstream operator. This can be particularly useful, for example, for user-defined operators.

One or more embodiments of the invention were conceived around the idea of a toolkit of operators. Currently, a single toolkit is available and it provides a collection of stream-relational operators. These operators can be used to implement any relational query with windowing extensions used in streaming applications. Also, one or more embodiments of the invention include language that supports the definition of user-defined operators.

For example, operators that can be supported include, functor, aggregate, join, sort, barrier, punctor, split, delay, etc. A functor operator is used for performing tuple-level manipulations such as filtering, projection, mapping, attribute creation and transformation. In these manipulations, the functor operator can access tuples that have appeared earlier in the input stream. An aggregate operator is used for grouping and summarization of incoming tuples. This operator supports a large number of grouping mechanisms and summarization functions. A join operation is used for correlating two streams. Streams can be paired up in several ways and the join predicate, that is, the expression determining when tuples from the two streams are joined, can be arbitrarily complex.

A sort operator is used for imposing an order on incoming tuples in a stream. The ordering algorithm can be tweaked in several ways. A barrier operator is used as a synchronization point. It consumes tuples from multiple streams, outputting a tuple only when a tuple from each of the input streams has arrived. A punctor operator is used for performing tuple-level manipulations where conditions on the current tuple, as well as on past tuples, are evaluated for generating punctuations in the output stream. A split operator is used for routing incoming tuples to different output streams based on a user-supplied routing condition. Additionally, a delay operator is used for delaying a stream based on a user-supplied time interval.

Edge adapters in the Spade language can also be described as language operators, source and sink. A source operator is used for creating a stream from data flowing from an external source. This operator is capable of performing parsing and tuple creation, and can interact with a diverse set of external devices. A sink operator is used for converting a stream into a flow of tuples that can be used by components that are not part of System S. Tasks of a sink operator include converting tuples into objects accessible externally through devices such as the file system or the network. The external resources referred to by the edge adapters are specified by a universal resource locator (URL). The URL information is used by the code generator to appropriately select external libraries as well as other resource-specific configurations. By way of example, the authentication and configuration issues associated with accessing external resources can be dealt with by crafting URLs with the necessary information or, in some cases, having the URL refer to a configuration file with additional information, including communication protocols, message formats, among other things.

Spade language also provides the capability for extending the basic building block operators by supporting user-defined operators (udops). These operators can make use of external libraries and implement operations that are customized to a particular application domain. For example, suppose a package for performing data mining on streams is available. The udop support enables an application to receive tuples from Spade streams, hand them over to the external package, perform computations, and, originate Spade streams for downstream consumption.

The udop code generator creates skeleton code and seamlessly integrates the user-defined operator dependencies in the overall build process. From the skeleton code, the application developer can tap the resources of the external libraries, customizing the internal operator processing to the needs of her application. For example, the skeleton code can be generated in C++, which allows for the easy integration of existing analytics, speeding up the process of integrating legacy code. Also, as described herein, user-defined operators can be targeted by the optimizer. In other words, built-in and user-defined operators alike are seamlessly processed by the code optimizer in building the corresponding System S application. Developers can employ udops for a wide-range of reasons from converting legacy applications to System S so that they can run in a stream environment, to wrapping external stream data mining libraries, to interfacing with external platforms, among others.

As noted herein, System S can support a wide-range of stream processing applications. The implication to the Spade programming language is the need to support a richer set of features than typically found in other stream processing platforms. These features span not only what have been made available by the stream engines developed by other groups, but also those aimed at providing language constructs and mechanisms to simplify the construction of System S applications. Exemplary advanced features are discussed below.

Spade language can include native supports for list types as well as vectorized operations thereon. In the domains of signal processing, data mining and pattern classification, straightforward vector manipulation is fundamental in approximating the problem formulation to its representation in terms of source code. Thus, such an approach improves usability. In one or more embodiments of the invention, attributes with list types are created, for example, by reading them from an external source via the source operator, by using a functor operator to create a new list attribute, and/or by using an aggregate operator to collect attributes from multiple tuples into a single list.

One or more embodiments of the present invention support expressions that mix and match list and scalar types. Moreover, many of the built-in Spade functions are list-type capable, that is, they accept list types where scalars are expected, and produce a list result accordingly. List types also enable easy string manipulations using regular expression matching, where match results are stored in a string list.

Another language feature is the support for sophisticated windowing mechanisms. Several of the Spade's built-in operators can be configurable in terms of their windowing behavior. Generally, there is support for tumbling windows, sliding windows, and punctuation-based windows. Also, sophisticated combinations of windowing boundaries and slide factors are possible (for example, count, time, and attribute-based windows, slides, and their combinations).

An exemplary windowing schema is tumbling windows. Tumbling windows are operated on and then flushed when they become full (for example, after a fixed number of tuples have been accumulated). Sliding windows, on the other hand, have two components, an expiration policy and a trigger mechanism. The expiration policy defines when accumulated tuples are purged and, therefore, they are no longer part of the internal state carried by an operator (for example, the last 100 most recent tuples are kept around). The trigger mechanism flags when the aggregation operation should take place (for example, an aggregation should be made and output every time a new tuple is received by the operator). Additionally, the support for punctuation-based windows allows the creation of explicit window boundaries in a stream. Such boundaries can be created by user-defined operators as well as by certain built-in operators. For a punctuation-based window, an operator accumulates tuples until a punctuation is received. Once the punctuation is received, the operation is performed, with rules governing how punctuations are propagated through a query network.

Also, one or more embodiments of the invention support a grouping mechanism associated with tumbling windows as well as sliding windows. The grouping mechanism can be a feature associated with the aggregate and equi-join operators that determines the scope for the expiration and trigger policies. For instance, they can apply to the whole window or to every distinct group currently in the window. For example, if an operator is configured such that it must keep 200 tuples, the Spade language has a notation to specify whether 200 tuples should be aggregated (or joined) for the whole window or for each group that it might be aggregating (or joining). This approach allows the simultaneous and independent aggregation and/or joining for distinct groups, which for a large number of groups typically translates into substantial computational savings.

As described herein, System S provides a wide-spectrum landscape for application development. In such an environment, noted aspect can include application interoperability. The basic wiring mechanism provided by the SPCore is fairly malleable, that is, processing elements can be connected to each other by hardwiring a connection or dynamically, by having a processing element specify a subscription flow specification expression, which determines the properties of streams to be consumed.

A Spade application can, in a controllable fashion, interoperate with other Spade applications as well as with any other System S application at run-time. While an application stream is, by default, only available to other consumer operators in the application that defines it, a stream can be made visible by exporting it. Conversely, external streams can be consumed by employing a reference to a virtual stream.

The techniques described herein also include optimization opportunities created by Spade's code generation framework. For example, one such opportunity is the operator grouping optimization, which deals with the mapping of operators into PEs. Another exemplary opportunity is the execution model optimization, which deals with the assignment of threads to operators. Additionally, yet another opportunity can include the vectorized processing optimization, which deals with the hardware acceleration of vectorized operations on lists.

The System S run-time deals with the scheduling and placement of PEs, whereas it does not handle operators directly. It is the responsibility of the Spade compiler to map operators into PEs. An approach of mapping each operator to a different PE results in significant overheads due to several factors. For example, each PE is a separate execution unit and thus, having as many PEs as operators, implies executing large number of processes or threads. This will limit the performance, especially when the job is not distributed over a large number of nodes, resulting in higher number of threads per node. Also, streaming data items from one PE to another involves message transmission and queuing delays, and thus having too many PEs will cause additional delays at each link of the data-flow graph. This will increase latency especially when the job is distributed over a large number of nodes (that is, higher transmission delays). On the other hand, the other extreme case of having a single PE obviously prevents one from making use of processing power from multiple nodes. Therefore, the goal of the operator grouping optimization is to find the best balance between these two extremes.

Figure 4:
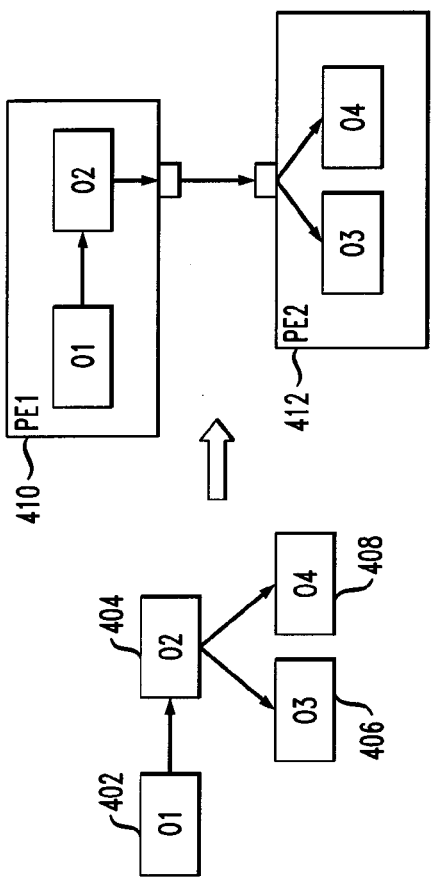
FIG. 4 is a diagram illustrating an exemplary operator to processing element (PE) mapping, according to an embodiment of the present invention.

FIG. 4 is a diagram illustrating an exemplary operator to PE mapping, according to an embodiment of the present invention. By way of illustration, FIG. 4 depicts the elements of operator 1 ($O_1$) 402, $O_2$ 404, $O_3$ 406, $O_4$ 408, $PE_1$ 410 and $PE_2$ 412.

FIG. 4 depicts an exemplary operator-to-PE mapping, where four operators are mapped into two PEs. Note that PEs have buffers attached to their input/output ports. When PEs are located in different nodes, tuples are marshaled into SDOs and transferred over the network from input buffers to output buffers. In contrast, only a pointer is passed around when the PEs are co-located on the same node and sit under the same PE container. The intra-PE transfers among operators within the same PE are significantly more efficient than their inter-PE counterparts.

As noted herein, Spade can map a set of operators into a PE. By default, operators that are part of a composite PE do not run parallel threads. Optionally, Spade can assign multiple parallel threads to operators. With the current trend of increasing the number of cores in CPU hardware to improve performance, multi-threading becomes an important aspect of high-performance applications. Making use of multiple cores at the level of operators entails generating multi-threaded code for the built-in operators. For instance, an aggregate operator can potentially use multiple threads to compute aggregates defined over different attributes, in parallel. Assuming built-in operators have parallel implementations, the high-level problem is to decide how to best distribute threads to operators within a PE. As such, to make use of multiple cores on a single node, one or more embodiments of the invention create multiple PE's to be run on the same node.

New opportunities in optimizing the execution model arise with the increasing diversity of the hardware available for general purpose computing, such as, for example, the cell processor, graphics processors (GPUs), network processors, etc. Acceleration of data stream operators on such hardware often requires a different execution model and specialized code. In one or more embodiments of the present invention, prototype implementations of stream joins and sorting can be performed on the ell processor. Integrating full cell support into Spade involves developing code generators to specialize these implementations for given operator configurations.

The vectorized operations on list types can be accelerated through single-instruction multiple-data (SIMD) operations available in most modern processors. One or more embodiments of the invention utilize streaming SIMD extensions (SSE) on the Intel processors to accelerate the basic arithmetic operations on list types. Spade's optimizing partitioner can use, for example, operator fusion as the underlying technique for forming PEs out of operators, and employs a two-phase learning-based optimization approach to configure the operator partitions.

The techniques described herein can use code generation to fuse operators into PEs. For example, a PE generator can produce code that fetches tuples from the PE input buffers and relays them to the operators within, receives tuples from operators within and inserts them into the PE output buffers, and for all the intra-PE connections between the operators, it fuses the outputs of operators with the inputs of downstream ones using function calls. This fusion of operators with function calls results in a depth-first traversal of the operator sub-graph that corresponds to the partition associated with the PE, with no queuing involved in-between.

As noted earlier, Spade supports multi-threaded operators, in which case the depth-first traversal performed by the main PE thread can be cut short in certain branches, where separate threads can continue from those branches independently. The latter requires operators to be thread-safe. For user-defined operators, one or more embodiments of the invention automatically protect the process techniques to provide thread-safety. For built-in operators, finer grained locking mechanisms can be used for this purpose. Spade code generators do not insert these locks into the code if an operator is not grouped together with other operators and is part of a singleton PE.

Because Spade supports feedback loops in the data-flow graph, an operator graph is not necessarily cycle-free, opening the possibility of infinite looping within a composite PE. The rationale behind allowing feedback loops in Spade is to enable udops to tune their logic based on feedback from downstream operators. Under operator fusion, Spade does not allow feedback links into built-in operators and expects feedback links into udops to be connected to non-tuple-generating inputs. This guarantees cycle free operation under operator fusion. Additionally, feedback loops can be a valuable asset in developing applications that are heavy on udops, an example of which is a semiconductor fabrication line monitoring application (built with Spade) that uses downstream yield statistics to tune its upstream detection algorithm.

In order to decide on how to best partition the operators into PEs, the techniques described herein obtain knowledge about resource usage characteristics of operators. Such characteristics are dependent on the workload, as well as the specific configurations of the operators. Even though the internal mechanics of built-in Spade operators are known, and thus a cost model can potentially be built, the same does not hold for user-defined operators. Moreover, heavy use of functions within expressions that appear in built-in operators makes it harder to come up with accurate cost models. Relying on the long-running nature of Spade jobs, one can adopt a learning-based statistics collection framework. Before compiling a Spade job for the final execution, one can compile it in a special statistics collection mode. The application can be run in this mode to collect run-time information for each operator and each link in the data-flow graph. These statistics include metrics such as, for example, CPU load and network traffic. After this information is collected, the application is compiled for a second time. In this second compilation step, the Spade optimizer uses the statistics collected in the earlier step to come up with an optimized operator grouping, and applies operator fusion to yield the composite PEs. At this point, the long-running Spade job is ready to be deployed.

Given the CPU load and network traffic statistics for the data-flow graph at hand, Spade's optimizing partitioner can aim at minimizing the total inter-PE communication, while respecting the constraint that the total load imposed by the operators within a PE should not exceed the capacity of a single processor. The optimizer will pick the smallest number of nodes that satisfy this constraint. Even though this strategy is more tailored towards throughput optimization, it also works well for reducing the latency. Also, crossing PE boundaries can be a major cause of increased latency. Thus, the conservative nature of Spade's optimizing partitioner with respect to creating additional PEs reduces the latency in general.

By way of example, consider a stock trading scenario where the aim is to find bargains to buy. A sell quote for a given stock is considered a bargain if it is available in quantity and at a cheaper price relative to its moving average price as seen in recent trades. A bargain index is a scalar value representing the magnitude of the bargain, that is, how much of a bargain it really is. As such, one or more embodiments of the present invention can compute the bargain index for every stock symbol that appears in the source stream. A visual representation of the Spade query that implements this logic using built-in Spade operators is depicted in FIG. 5.

Figure 5:
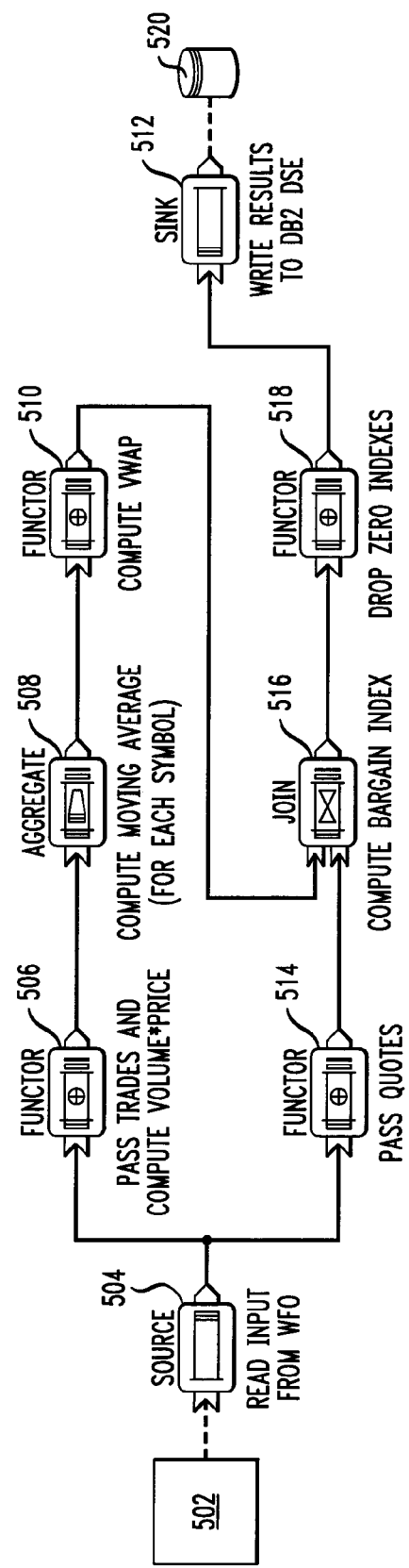
FIG. 5 is a diagram illustrating a bargain index computation for all stock symbols, according to an embodiment of the present invention.

FIG. 5 is a diagram illustrating a bargain index computation for all stock symbols, according to an embodiment of the present invention. By way of illustration, FIG. 5 depicts the elements of a comma separated values (csv) file 502, a source operator 504, a functor operator 506, an aggregate operator 508, a functor operator 510, a sink operator 512, a functor operator 514, a join operator 516, a functor operator 518 and a database 520.

Source data can include trade and quote information. A trade shows the price of a stock that was just traded, whereas a quote reveals either an "ask" price to sell a stock or a "bid" price to buy a stock. For such an application, only the ask price in the quote data is considered. That is, one would care about sell quotes and ignore the buy ones. The table below lists relevant fields of the trade and quote data. Note that, each trade has an associated price and a volume, whereas each quote has an associated ask price and an ask volume. As in FIG. 5, live stock data can be read directly from a middleware platform for performing front office processing tasks in financial markets. Spade's source operator can include built-in support for tapping into WFO sources and converting them into Spade streams.

| Ticker | Type  | Price | Volume | Ask Price | Ask Size |
|--------|-------|-------|--------|-----------|----------|
| MWG    | Trade | 24.27 | 500    | —         | —        |
| TEO    | Quote | —     | —      | 12.85     | 1        |
| UIS    | Quote | —     | —      | 5.85      | 6        |
| NP     | Trade | 28.00 | 5700   | —         | —        |
| TEO    | Trade | 12.79 | 700    | —         | —        |

To compute the bargain index, the source stream is separated into two branches, trades and quotes. This can be achieved via the use of two functor operators (see FIG. 5). The functor operator that creates the upper trade branch also computes trade price×volume, which will later be used to compute the volume weighted average price (VWAP), a commonly used metric in algorithmic trading. The aggregate operator that follows the functor computes a moving sum over price×volume and volume. It can use, for example, a per-group window of size 15 tuples with a slide of 1 tuple. That is, it outputs a new aggregate every time it receives a trade, where the aggregate is computed over the last 15 tuples that contained the same stock symbol of the last received trade.

Another functor operator can be used to divide the moving summation of price×volume to that of volume, giving the most recent VWAP value for the stock symbol of the last received trade. The resulting intermediate stream is connected to the first input of an equi-join (on stock symbol) operator, which can have a per-group window of size 1 tuple on the same input. In other words, the join window for the first input has one group for each unique stock symbol seen so far and stores the last VWAP value within each group. The second input of the join is connected to the quote stream, and has a zero-sized window (this is a single-sided join).

The aim is to associate the last received quote with the most recent VWAP value computed for the stock symbol of that quote. Once this is done, a simple formula can be used to compute the bargain index as a function of the ask price, ask size, and the VWAP value. A final functor operator can filter out the bargain indexes that are zero, indicating that a bargain has not been detected.

In FIG. 5, the non-zero bargain index values are fed into a sink operator, which can be connected to, for example, an extension of DB2 designed for persisting high-rate data streams. The result database can potentially be connected to an automated trading platform in order to act upon the bargain index results.

One or more embodiments of the invention also include a parallel and distributed version of the same query that can provide brief performance results. To showcase scalability, for example, one can use historic market feed data stored on the disk. An exemplary data set described herein contains 22 days worth of ticker data (the month of December 2005) for ≈3000 stocks with a total of ≈250 million trade and quote transactions, resulting in ≈20 GBs of data. It can be organized, for example, as one file per day on the disk. For this workload, one can run the bargain index computation query and store the detected bargains back into output files on a general parallel file system (GPFS). To parallelize the processing, one can run 22 copies of the flow depicted in FIG. 5, one for each trading day. This can be achieved, for example, using a Spade for loop construct that encloses the complete query specification.

For performance reasons, one can run operators that are part of the processing of the same day within a single PE, and distribute a PE over 16 nodes in a cluster. One or more embodiments of the invention can express more sophisticated parallelization and distribution schemes, yet for this application a simple coarse-grained scheme is sufficiently effective. Additionally, in one or more embodiments of the invention, a developer interacts only with the Spade language and the compiler when generating a parallel and distributed system S application (for example, like the bargain index computation one described herein).

Figure 6:
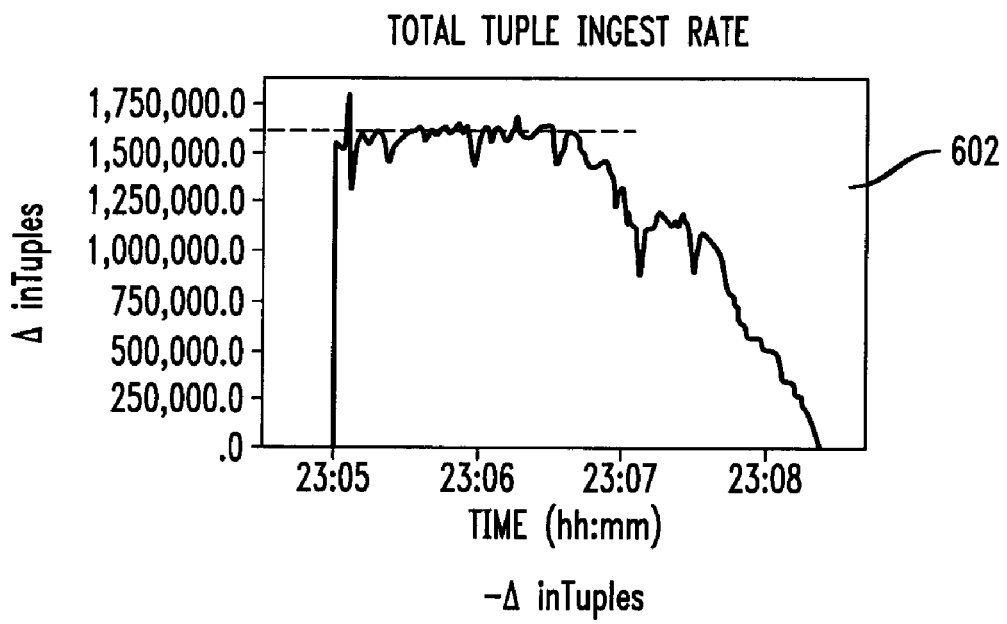
FIG. 6 is a diagram illustrating tuple ingestion rate for the parallel and distributed bargain index computation application, according to an embodiment of the present invention.

The resulting application run-ables are easily deployable on the system S cluster using convenience scripts automatically generated by the Spade compiler, which in turn rely on the system S job management infrastructure. FIG. 6 illustrates the performance obtained from running an exemplary application.

FIG. 6 is a diagram 602 illustrating tuple ingestion rate for the parallel and distributed bargain index computation application, according to an embodiment of the present invention. FIG. 6 plots the aggregate tuple ingestion rate as a function of the current wall-clock time. Note that the sustained processing rate is around 1.6 million tuples per second (tuples/sec) and the total time required to compute all the bargain index values for a month's worth of disk resident data takes less than 3.5 minutes. The downward trend in the aggregate ingestion rate after the initial flat plateau is due to some of the daily sub-queries completing earlier than some others, since different days have differing trading volumes. Moreover, recall that 22 queries are distributed over 16 machines, which results in further imbalance in the server loads. This is because all operators within the same query are packed into a single PE, resulting in 22 units that are distributable over 16 machines. However, the choice of 16 nodes for the experimental study illustrated herein was not arbitrary. The available nodes that have high-bandwidth access to the GPFS file system were selected in order to avoid a potential file system bottleneck.

As noted above, the techniques described herein provide a declarative stream processing engine (also referred to herein as system S' Spade). One or more embodiments of the present invention include an aspect wherein the native support for edge adapters and toolkits of operators, as well as the reliance on code generation, coupled with the optimization framework make Spade particularly suitable for building high-performance scalable stream processing applications. Also, its ability to extend the collection of edge adapters and toolkits make it advantageous for developing applications geared towards application domains that have yet been contemplated.

One or more embodiments of the invention can be directly usable by application developers for quickly prototyping complex applications. Additionally, as described herein, performance results are shown for a relatively complex stream processing application built completely with Spade. As such, one or more embodiments of the invention provide an advantageous set of abstractions for composing and building large-scale, distributed, and scalable stream processing applications.

Figure 7:
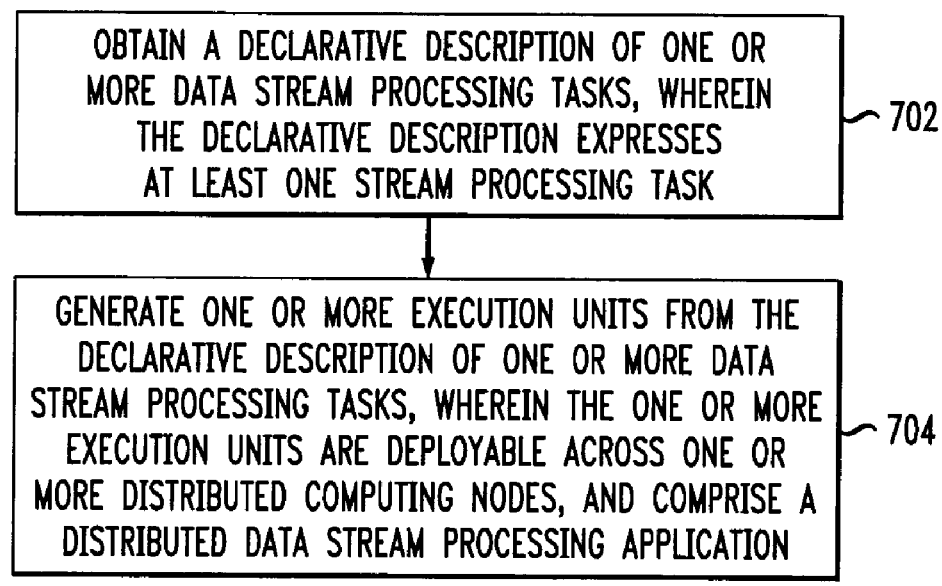
FIG. 7 is a flow diagram illustrating techniques for generating a distributed stream processing application, according to an embodiment of the present invention.

FIG. 7 is a flow diagram illustrating techniques for generating a distributed stream processing application, according to an embodiment of the present invention. Step 702 includes obtaining a declarative description of one or more data stream processing tasks, wherein the declarative description expresses at least one stream processing task. The declarative description can express at least one stream processing task using one or more fine granularity operators. Step 704 includes generating one or more execution units from the declarative description of one or more data stream processing tasks, wherein the one or more execution units are deployable across one or more distributed computing nodes, and comprise a distributed data stream processing application. In one or more embodiments of the invention, a compiler can be used to generate the execution units from the declarative description of data stream processing tasks. An optimizing compiler can, for example, automatically map applications into appropriately sized execution units in order to minimize communication overhead, while at the same time exploiting available parallelism.

The techniques depicted in FIG. 7 can also include, for example, using a stream-centric and operator based paradigm for declaring stream processing applications, using type-generic data stream processing operators that are declaratively specified and for which code is automatically generated by the compiler, using user-defined operators to wrap legacy code, and/or using procedural constructs to control the coalescing level of operators that are employed by a stream processing application.

The techniques depicted in FIG. 7 can also include generating one or more coarse granularity containers that encompass one or more fine granularity stream processing operators, and using the one or more coarse granularity containers to implement a system for generating a distributed stream processing application.

One or more embodiments of the invention can also include, for example, generating containers that encompass a combination of stream processing operators, wherein generating the containers includes coalescing a combination of operators into one or more containers and fusing an outflow of an operator into an inflow of a downstream operator within a same container. Coalescing the combination of operators into one or more containers can include, for example, using an optimizer to automatically decide which of the operators are to be coalesced into which of the containers, and using user input to manually group the operators into the one or more containers. Fusing an outflow of an operator into an inflow of a downstream operator within the same container can include, for example, using function calls to propagate stream data objects from the output of an upstream operator to the input of a downstream operator that is in the same container, and using queues and execution threads to propagate stream data objects from the output of an upstream operator to the input of a downstream operator that is in the same container.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 8:
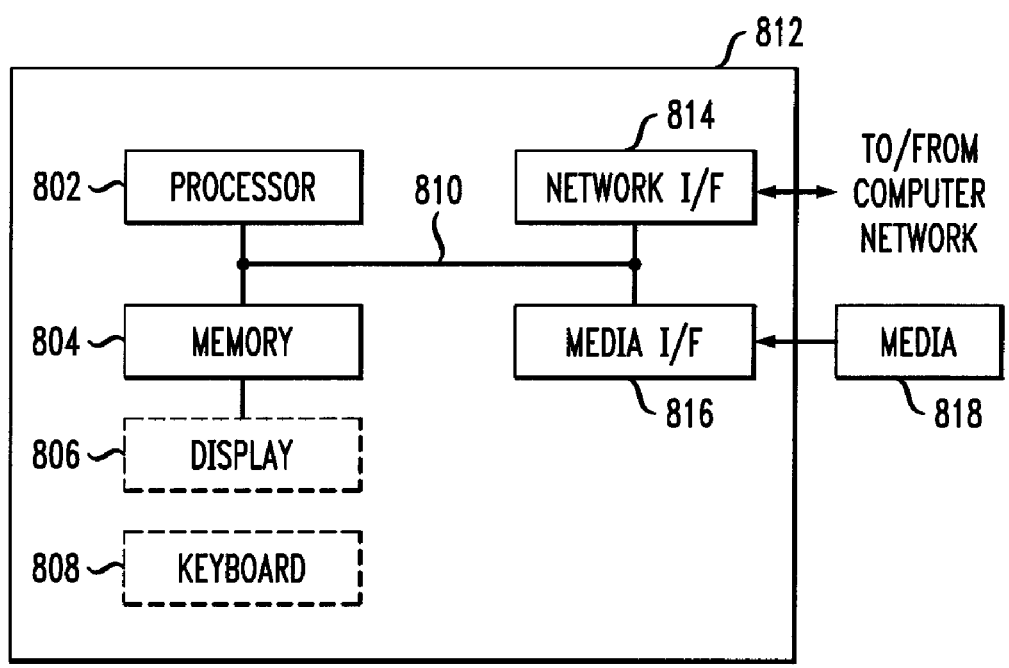
FIG. 8 is a system diagram of an exemplary computer system on which at least one embodiment of the present invention can be implemented.

At present, it is believed that the preferred implementation will make substantial use of software running on a general-purpose computer or workstation. With reference to FIG. 8, such an implementation might employ, for example, a processor 802, a memory 804, and an input and/or output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 802, memory 804, and input and/or output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 818) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 804), magnetic tape, a removable computer diskette (for example, media 818), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, enabling application developers to construct applications with fine granularity stream operators without worrying about the performance implications that might exist in a distributed system.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for generating a distributed stream processing application, comprising the steps of:

obtaining a declarative description of one or more data stream processing tasks from a graph of operators, wherein the declarative description expresses at least one stream processing task;

generating one or more containers that encompass a combination of one or more stream processing operators via fusing an output of an upstream operator into an input of a downstream operator within a same container, wherein said fusing comprises:

using a function call to propagate one or more stream data objects from the output of the upstream operator to the input of the downstream operator; and using one or more queues and one or more execution threads to propagate one or more stream data objects from the output of the upstream operator to the input of the downstream operator; and generating one or more execution units from the declarative description of one or more data stream processing tasks, wherein the one or more execution units are deployable across one or more distributed computing nodes, and comprise a distributed data stream processing application binary.

2. The method of claim 1, wherein the declarative description expresses at least one stream processing task using one or more fine granularity operators.

3. The method of claim 1, further comprising using a stream-centric and operator based paradigm for declaring one or more stream processing applications.

4. The method of claim 1, further comprising using one or more type-generic data stream processing operators that are declaratively specified and for which code is automatically generated by a compiler.

5. The method of claim 1, further comprising using one or more user-defined operators to wrap legacy code.

6. The method of claim 1, further comprising using one or more procedural constructs to control a coalescing level of one or more operators that are employed by a stream processing application.

7. The method of claim 1, further comprising the steps of:

generating one or more coarse granularity containers that encompass one or more fine granularity stream processing operators; and using the one or more coarse granularity containers to generate a distributed stream processing application.

8. The method of claim 1, wherein generating the one or more containers comprises the steps of:

coalescing a combination of one or more operators into one or more containers.

9. The method of claim 1, wherein coalescing the combination of one or more operators into one or more containers comprises the steps of:

using an optimizer to automatically decide which of the one or more operators are to be coalesced into which of the one or more containers; and using user input to manually group the one or more operators into the one or more containers.

10. The method of claim 1, wherein generating one or more execution units from the declarative description of one or more data stream processing tasks comprises using a compiler.

11. A computer program product embodied in a non-transitory computer readable recordable storage medium having computer readable program code for generating a distributed stream processing application, said computer program product including:

computer readable program code for obtaining a declarative description of one or more data stream processing tasks from a graph of operators, wherein the declarative description expresses at least one stream processing task;

computer readable program code for generating one or more containers that encompass a combination of one or more stream processing operators via fusing an output of an upstream operator into an input of a downstream operator within a same container, wherein said fusing comprises:

using a function call to propagate one or more stream data objects from the output of the upstream operator to the input of the downstream operator; and using one or more queues and one or more execution threads to propagate one or more stream data objects from the output of the upstream operator to the input of the downstream operator; and computer readable program code for generating one or more execution units from the declarative description of one or more data stream processing tasks, wherein the one or more execution units are deployable across one or more distributed computing nodes, and comprise a distributed data stream processing application binary.

12. The computer program product of claim 11, wherein the declarative description expresses at least one stream processing task using one or more fine granularity operators.

13. The computer program product of claim 11, further comprising computer readable program code for using a stream-centric and operator based paradigm for declaring one or more stream processing applications.

14. The computer program product of claim 11, further comprising computer readable program code for using one or more type-generic data stream processing operators that are declaratively specified and for which code is automatically generated by a compiler.

15. The computer program product of claim 11, further comprising computer readable program code for using one or more user-defined operators to wrap legacy code.

16. The computer program product of claim 11, further comprising computer readable program code for using one or more procedural constructs to control a coalescing level of one or more operators that are employed by a stream processing application.

17. The computer program product of claim 11, wherein the computer readable program code for generating one or more execution units from the declarative description of one or more data stream processing tasks comprises computer readable program code for using a compiler.

18. An apparatus for generating a distributed stream processing application, comprising:

a memory; and at least one processor coupled to said memory and operative to:

obtain a declarative description of one or more data stream processing tasks from a graph of operators, wherein the declarative description expresses at least one stream processing task;

generate one or more containers that encompass a combination of one or more stream processing operators via fusing an output of an upstream operator into an input of a downstream operator within a same container, wherein said fusing comprises:

using a function call to propagate one or more stream data objects from the output of the upstream operator to the input of the downstream operator; and using one or more queues and one or more execution threads to propagate one or more stream data objects from the output of the upstream operator to the input of the downstream operator; and generate one or more execution units from the declarative description of one or more data stream processing tasks, wherein the one or more execution units are deployable across one or more distributed computing nodes, and comprise a distributed data stream processing application binary.

19. The apparatus of claim 18, wherein the declarative description expresses at least one stream processing task using one or more fine granularity operators.

20. The apparatus of claim 18, wherein the at least one processor coupled to said memory is further operative to use a stream-centric and operator based paradigm for declaring one or more stream processing applications.

21. The apparatus of claim 18, wherein the at least one processor coupled to said memory is further operative to use one or more type-generic data stream processing operators that are declaratively specified and for which code is automatically generated by a compiler.

22. The apparatus of claim 18, wherein the at least one processor coupled to said memory is further operative to use one or more user-defined operators to wrap legacy code.

23. The apparatus of claim 18, wherein the at least one processor coupled to said memory is further operative to use one or more procedural constructs to control a coalescing level of one or more operators that are employed by a stream processing application.

24. The apparatus of claim 18, wherein the at least one processor coupled to said memory and operative to generate one or more execution units from the declarative description of one or more data stream processing tasks is further operative to use a compiler to generate one or more execution units.

* * * * *